April 27, 1965 E. F. YENDALL ETAL 3,180,709
PROCESS FOR LIQUEFACTION OF LOW-BOILING GASES
Filed June 29, 1961 2 Sheets-Sheet 1

INVENTORS
EDWARD F. YENDALL
OSCE P. ROBERTS, JR.
BY William F. Mesinger
ATTORNEY

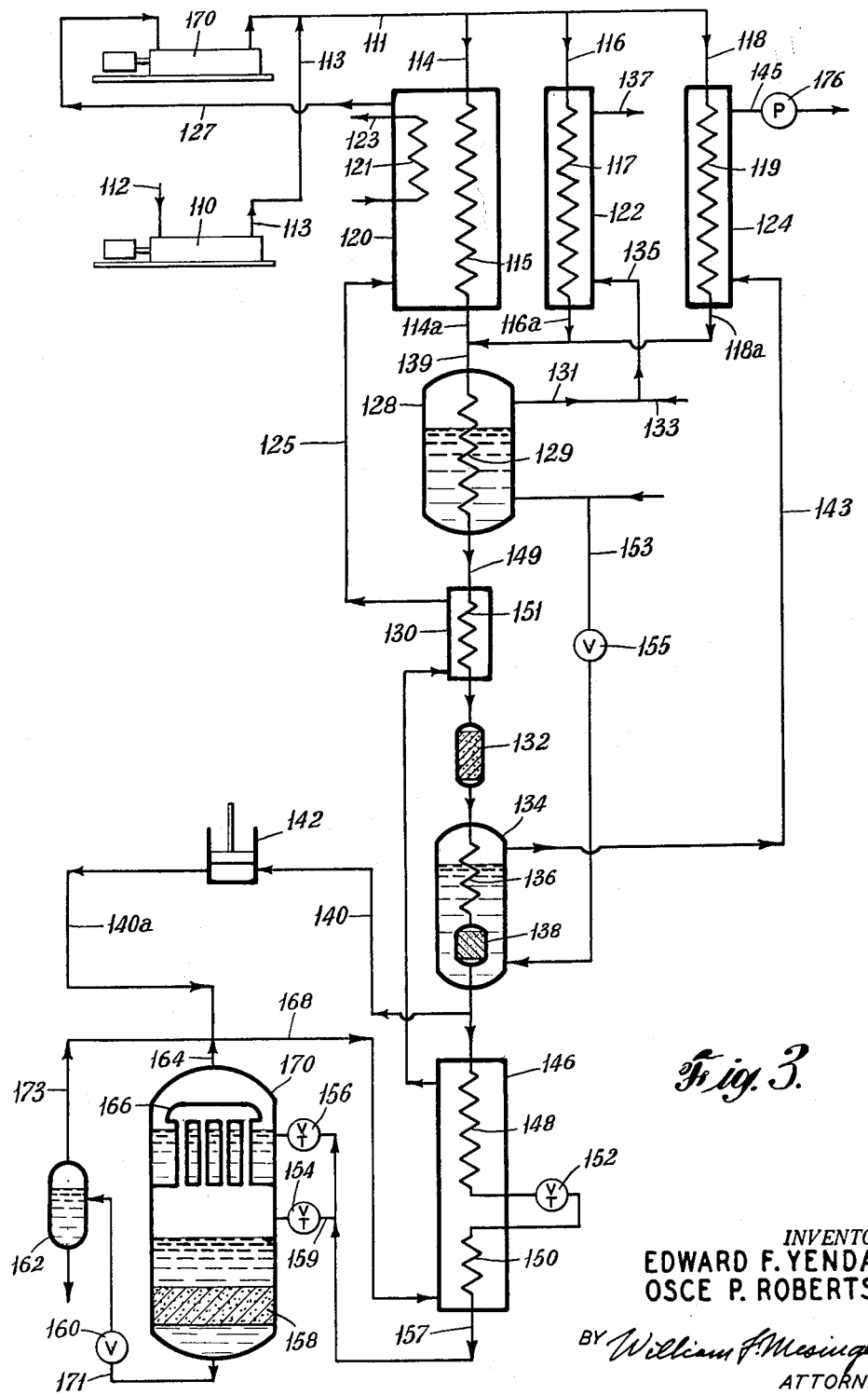

United States Patent Office

3,180,709
Patented Apr. 27, 1965

3,180,709
PROCESS FOR LIQUEFACTION OF LOW-BOILING GASES
Edward F. Yendall, Kenmore, and Osce P. Roberts, Jr., Grand Island, N.Y., assignors to Union Carbide Corporation, a corporation of New York
Filed June 29, 1961, Ser. No. 120,563
14 Claims. (Cl. 23—210)

This invention relates to a process of and apparatus for liquefaction of low boiling gases, particularly hydrogen, helium and neon, wherein multiple isenthalpic expansion steps are used in parallel combination with a work expander to produce cycle refrigeration more efficiently.

In gas liquefaction cycles, particularly those for liquefying hydrogen or helium at pressures exceeding the respective critical pressures of the aforementioned substances, it is customary to provide cycle refrigeration by utilizing the positive Joule-Thomson effect. Under certain temperature and pressure conditions, however, isenthalpic expansion of a gas causes the gas temperature to increase rather than decrease. When this occurs the Joule-Thomson coefficient defined as $dT/dP$ at constant enthalpy is negative rather than positive. Under these conditions of temperature and pressure, advantageous use of the negative Joule-Thomson coefficient may be employed to improve the performance of low-temperature countercurrent heat exchangers for a given liquefaction cycle. Using this technique, the pressure of the gas is varied while the gas is being cooled to maintain the warmest temperature level obtainable for each particular enthalpy value of the gas.

The positive Joule-Thomson effect, i.e., decreasing temperatures during expansion, is commonly used in refrigeration cycles. In these cycles, the gas is first cooled to as low a temperature as possible by heat exchange with a colder fluid(s) and is then throttled to produce a partially liquefied stream. The negative Joule-Thomson effect, i.e., increasing temperature during expansion, is seldom utilized in refrigeration cycles.

It is an object of this invention to provide a low-temperature liquefaction process and apparatus therefore wherein maximum temperature differences within the countercurrent heat exchanger(s) are obtained to promote better heat transfer therein by providing an intermediate expansion utilizing the negative Joule-Thomson expansion effect.

It is another object of this invention to provide a low-temperature liquefaction process and apparatus therefore whereby the intermediate expansion step is employed in combination with a parallel work expansion step to appreciably increase cycle efficiency and consequently product yield.

Figure 1:
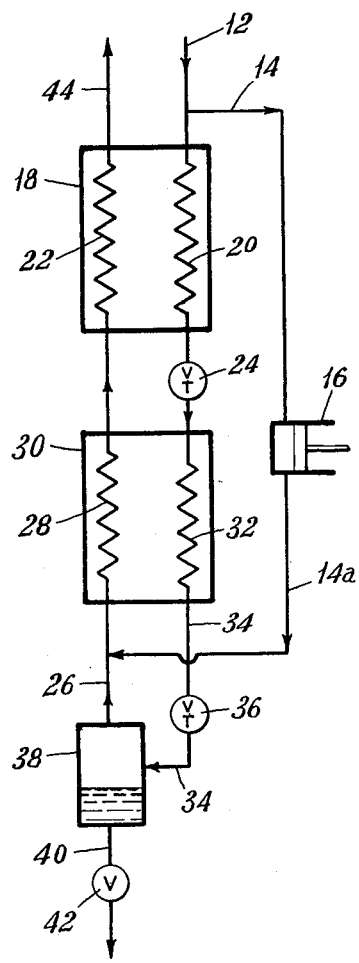
FIG. 1 is a diagrammatic view of a flowsheet illustrating an "open" liquefaction cycle utilizing the parallel steps of Joule-Thomson expansion in combination with a work expansion step.

According to the present invention, a process gas, say for example hydrogen at 60 atmospheres' pressure and below 35° K., is expanded isenthalpically at an intermediate point in a liquefaction cycle. The resulting temperature of the gas would initially increase due to the negative Joule-Thomson coefficient. The intermediate expansion of a given gaseous feed stream to be liquefied may, at some point between initial and final pressure, exhibit the usual positive Joule-Thomson coefficient. This would mean that various point or differential values of the Joule-Thomson coefficient would be positive. The instant invention, however, contemplates the intermediate expansion step wherein the pressure difference and the temperature difference realized by a given feed stream to be liquefied are of such values to produce a negative Joule-Thomson coefficient, i.e., the overall or integral effect of the intermediate expansion step yields a negative Joule-Thomson coefficient regardless of the differential values of the Joule-Thomson coefficient which occur between initial and final condition. The pressure reduction may be accomplished in one step, in several successive steps, or continuously as desired. Exemplary apparatus for throttling may consist of valves, section(s) of small diameter tubes, by reduced area flow passages or by utilizing a suitable porous media within the flow passages of the heat exchanger. The principal function of the negative integral expansion of the high-pressure feed stream to be cooled is to maintain the temperature of the feed gas as high as possible for a particular enthalpy level. In this manner the maximum temperature difference within the countercurrent heat exchanger is achieved thereby promoting maximum heat transfer therein. The aforementioned temperature difference increase is obtained by isenthalpically reducing the pressure when the gas to be liquefied is at appropriate conditions as dictated by the thermodynamic properties of the particular gas to be liquefied. When the negative integral expansion step is combined in parallel with a work expansion step, an appreciable increase in product yield is noted per unit of energy expended. Thus, when a negative integral expansion step is employed in, for example, a Heylandt type liquefaction cycle, an optimum flow split between Joule-Thomson expansion and work expansion steps is achieved which improves cycle efficiency. Without the use of an intermediate expansion step exhibiting a negative integral effect, the flow through the low-pressure passages of the heat exchanger would cause an undesirably large temperature difference at the warm end of the heat exchanger or heat exchange path immediately preceding the expansion with resulting refrigeration losses. If this temperature difference becomes too great, even an infinitely large heat exchanger would not perform the necessary warming of the returning refrigerant stream. The quantity of fluid which may be usefully work expanded is therefore limited by the heat exchange temperature difference requirements. However, by use of a negative integral expansion step, the mean $\Delta T$ existing in the heat exchanger immediately preceding the expansion step is improved so that the flow of the high pressure feed stream through the heat exchanger may be reduced and yet avoid an undesirably large temperature difference at its warm end. Such operation permits a corresponding increase in flow through the work expander with a resulting greater liquid product yield from the cycle.

The gases which may be advantageously liquefied according to the principles set forth herein are numerous and include methane, oxygen, air, argon, nitrogen, neon, hydrogen, and helium. All of the aforementioned gases would be compressed to at least twice their respective critical pressures and forecooled to that temperature level where the negative integral Joule-Thomson expansion is to be accomplished. The compression of a given feed stream to at least twice its critical pressure prior to negative integral Joule-Thomson expansion is usually carried out in "open" type liquefaction cycles. "Closed" type liquefaction cycles utilizing the invention disclosed herein would usually compress only the refrigerant stream to at least twice its critical pressure; however, compression of both feed and refrigerant streams to at least twice the critical pressure of each may also be employed.

Such an arrangement could utilize negative integral Joule-Thomson expansion in the feed stream, in addition to negative integral Joule-Thomson expansion with parallel work expansion, of the refrigerant stream. It has also been found that further improvement in liquid yield may be obtained by locating the negative integral Joule-Thomson expansion zone at such a position within the liquefaction cycle that the temperature of the feed gas at the inlet of the negative integral expansion zone is at least 5° C. warmer than the liquefied product.

Referring to the drawings, and particularly to FIG. 1, an exemplary "open" type liquefaction cycle embodying the parallel steps of negative integral Joule-Thomson valve expansion and work expansion is illustrated. It should be noted that the particular device to accomplish negative integral Joule-Thomson expansion is not critical. Although expansion valves are illustrated and discussed, it is to be understood that any suitable pressure reducing device which produces the desired negative integral effect will adequately suffice for the purpose of this invention. By "open" it is meant that a portion of the product stream being liquefied is used as the refrigerant stream being recirculated. A portion of a high pressure, partially cooled feed stream flowing in conduit 12 is diverted to branch conduit 14 having work expander 16 therein. The undiverted portion of the partially cooled high pressure feed stream enters a first heat exchanger 18 wherein it is countercurrently cooled in heat exchange path 20 at least in part by the outgoing vapor phase of the subsequently liquefied feed stream flowing in heat exchange path 22. The undiverted portion of the feed stream exiting from the cold end of heat exchanger 18 is throttled at a negative integral Joule-Thomson expansion zone utilizing expansion valve 24. As previously mentioned, it is preferable to locate the negative integral expansion zone, herein illustrated as a valve 24, such that the temperature of the undiverted feed stream leaving heat exchange path 20 and entering valve 24 is at least 5° K. warmer than the liquid in separator 38. The diverted portion of the feed stream flowing in branch conduit 14 is passed to work expander 16 whereupon the diverted portion is expanded to produce cycle refrigeration. The undiverted feed stream after throttling in the negative integral expansion zone 24 is passed to a second heat exchanger 30 wherein it is countercurrently further cooled in heat exchange path 32 by cold outgoing vapors flowing in heat exchange path 28. The further cooled undiverted feed stream is passed from the cold end of heat exchanger 30 to conduit 34 having isenthalpic expansion valve 36 therein. The further cooled, undiverted feed stream is throttled at expansion valve 36 thereby partially liquefying the further cooled, undiverted feed stream. The partially liquefied feed stream is passed to separator 38 from which the liquefied feed stream is withdrawn through conduit 40 having liquid draw-off valve 42 therein. The portion of the feed stream remaining vaporous is passed from separator 38 to conduit 26 whereupon the cold vapor from the separator is combined with the exhaust from work expander 16 flowing in conduit 14A. These combined streams are subsequently passed to paths 28 and 22 in heat exchangers 30 and 18 respectively for countercurrent cooling of the undiverted portion of the feed stream. The warmed refrigerant exiting from the warm end of heat exchanger 18 through conduit 44 may be discarded or recompressed and combined with a make-up feed stream which is then returned to the cycle. By employing the negative integral expansion of the undiverted feed stream at 24, a more optimum flow split between isenthalpic valve expansion and work expansion is permitted which markedly improves the overall cycle efficiency for providing refrigeration. For example, without the negative integral expansion zone 24, the flow through the high pressure passages 20 of heat exchanger 18 which immediately precedes the intermediate expansion must not be so great as to cause an undesirably large temperature difference at the warm end of heat exchanger 18. If the temperature difference becomes too great even an infinitely large heat exchanger would not perform the necessary warming of the stream flowing countercurrent thereto in heat exchange paths 28 and 22. The quantity of fluid which may be work expanded is, therefore, limited by the heat exchange temperature difference requirement. However, by means of negative integral expansion zone 24 the heat exchanger $\Delta T$ at the warm end of heat exchanger 18 is improved so that the high pressure flow through the heat exchanger may be reduced while simultaneously avoiding an undesirably large temperature difference. Such a parallel combination of negative integral expansion and work expansion allows the flow through the work expander to be increased correspondingly with a greater yield of liquid product from the cycle.

It has been found that for hydrogen liquefaction cycles operating at inlet pressures above 30 atmospheres and up to 160 atmospheres' pressure that the optimum flow split through a negative integral Joule-Thomson expansion zone in parallel combination with a work expansion step is usually about 50% of the total process flow; however, flows of from 40% to 60% of the total process flow through the negative integral Joule-Thomson expansion zone have been found useful. Below 40% the high-pressure flow through the heat exchangers is insufficient to warm the low-pressure refrigerant streams adequately. Such a condition would produce undesirably large temperature differences at the warm end of heat exchanger 18. Above 60%, the high-pressure feed stream is inadequately cooled. This reduces the amount of liquid obtainable upon final expansion of the feed stream. Negative integral Joule-Thomson expansion may also be employed in parallel combination with staged work expanders. Staged work expanders would normally be utilized to prevent the occurrence of a liquid phase in the expander exhaust or because of mechanical limitations of an individual expander.

Figure 2:
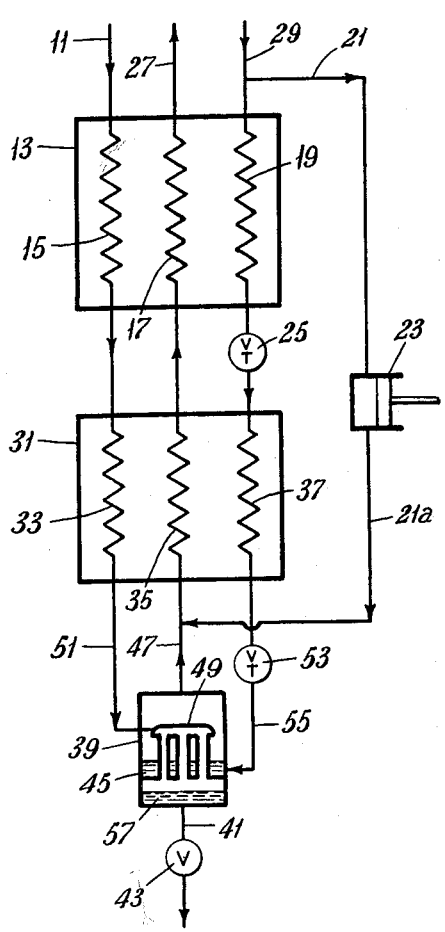
FIG. 2 is a diagrammatic view of a flowsheet illustrating a "closed" liquefaction cycle utilizing the parallel steps of Joule-Thomson expansion in combination with a work expansion step; and, FIG. 3 is a diagrammatic view of a flowsheet illustrating a hydrogen liquefaction cycle utilizing the parallel steps of intermediate Joule-Thomson expansion in combination with a work expansion step.

FIG. 2 illustrates an exemplary "closed" type liquefaction cycle embodying the parallel steps of negative integral Joule-Thomson valve expansion in parallel with a work expansion step. By "closed" it is meant that the refrigerant stream is separate from the feed stream to be liquefied and is usually recirculated. A pressurized, partially cooled feed stream which has been compressed to at least twice its critical pressure and flowing in conduit 11 is passed to heat exchange path 15 located in first heat exchanger 13, where the feed stream is countercurrently cooled against a recirculating refrigerant flowing in heat exchange path 17 located in first heat exchanger 13 which has been compressed to at least twice its critical pressure. A portion of the pressurized recirculating refrigerant flowing in conduit 29 is diverted to branch conduit 21 having work expander 23 located therein. The undiverted refrigerant is passed to heat exchange path 19 located in first heat exchanger 13 where the undiverted refrigerant is also countercurrently cooled against the recirculating refrigerant flowing in path 17 of heat exchanger 13. The diverted portion of the refrigerant is work expanded at 23 to produce cycle refrigeration and passed to conduit 21A. The cooled compressed feed stream exiting from the cold end of first heat exchanger 13 is passed to heat exchange path 33 in second heat exchanger 31 where it is still further cooled against recirculating refrigerant flowing in heat exchange path 35. The undiverted refrigerant flowing in heat exchange path 19 exits from the cold end of first heat exchanger 13 whereupon the undiverted refrigerant is expanded at negative integral Joule-Thomson expansion zone 25. The expanded refrigerant is then passed to heat exchange path 37 located in second heat exchanger 31 where it is further cooled against recirculating refrigerant flowing in heat exchange path 35. The expanded, further cooled refrigerant leaving the cold end of second heat exchanger 31 is further expanded at 53 whereupon the refrigerant is partially liquefied. The liquid-vapor mixture is then passed to separator 39 having heat exchanger 49 therein. The still further cooled feed stream exiting from the cold end of second heat exchanger 31 through conduit 51 is passed to heat exchanger 49 in condenser-separator 39 where the feed stream is thermally contacted with the liquid portion of the undiverted refrigerant 45 whereupon the feed stream is liquefied. The now liquefied feed stream 57 is withdrawn from condenser-separator 39 through conduit 41 having draw-off valve 43 therein. The still vaporous undiverted refrigerant and the vapors produced by the evaporating refrigerant liquid 45 are withdrawn from condenser 39 through conduit 47 and subsequently combined with the diverted work expanded refrigerant flowing in conduit 21A. The combined refrigerant stream is then passed to heat exchange paths 35 and 17 located in heat exchanger 31 and 13 respectively, where the refrigerant is countercurrently warmed against incoming feed and undiverted refrigerant. The warmed refrigerant exits from the warm end of first heat exchanger 13 through conduit 27 whereupon the warmed refrigerant is passed to a compressor (not illustrated) and returned to the cycle through conduit 29. The "closed" liquefaction cycle hereinabove described may be advantageously employed, for example, where high para-hydrogen is the product and normal hydrogen is the refrigerant. Such an arrangement would mean that ortho-para converters would be required only in the product stream and would thus be smaller than those required if an "open" cycle were used because only the product stream need be contacted in an ortho-para converter as opposed to contacting the entire stream with the converter if an "open" cycle were employed. As a further example of the closed cycle, deuterium or neon could be the separate product stream with hydrogen or helium used for the recirculated refrigerant stream. Also, if the product is at a relatively high pressure, it might be desirable to use a negative integral expansion step in the product stream in addition to an intermediate expansion step in the recycled refrigerant stream.

FIG. 3 illustrates a novel process for the conversion to and liquefaction of para-hydrogen utilizing the parallel steps of negative integral Joule-Thomson expansion and work expansion wherein a partially compressed purified hydrogen feed stream flowing at a rate of about 160,000 cubic feet per hour (c.f.h.) measured at normal temperature and pressure (NTP) in conduit 112 is further compressed to about 880 p.s.i.g. in booster compressor 110. The high-pressure hydrogen feed stream is passed from booster compressor 110 into conduit 113 whereupon it is passed to conduit 111 and joined thereat by recycled hydrogen refrigerant which has been recompressed in main compressor 170 to about 880 p.s.i.g. The total flow of purified hydrogen feed and recycled hydrogen at the junction of conduit 111 with branch conduit 113 is about 620,000 c.f.h. measured at NTP. The high-pressure hydrogen is subsequently divided into three separate and approximately equal streams which flow in branch conduits 114, 116, and 118. The hydrogen to be liquefied flowing in conduit 114 flows through path 115 in first heat exchanger 120 where it is countercurrently cooled against a crude gas stream flowing in conduit 123 and through heat exchange path 121 located in exchanger 120. The crude gas stream enters flow path 121 at a rate of about 413,000 c.f.h. measured at NTP at a temperature of about 205° K. and absorbs sufficient thermal energy to raise its temperature to about 290° K. The crude gas stream is only illustrative of any suitable refrigerant and does not form a part of this invention. The hydrogen feed to be liquefied flowing in path 115 is further countercurrently cooled against recycling hydrogen refrigerant which enters heat exchanger 120 through conduit 125 and exits therefrom through conduit 127. The hydrogen to be liquefied flowing in branch conduit 116 flows through path 117 in second heat exchanger 122 where it is countercurrently cooled against nitrogen vapor derived from liquid nitrogen being evaporated at slightly above atmospheric pressure and which enters heat exchanger 122 through conduit 135 and exits through conduit 137. The hydrogen to be liquefied flowing in branch conduit 118 flows through path 119 in third heat exchanger 124 where it is countercurrently cooled against nitrogen vapor derived from liquid being evaporated at some pressure less than atmospheric, and which enters heat exchanger 124 through conduit 143 and exits through conduit 145. The evaporation of the liquid nitrogen below atmospheric pressure is caused by vacuum pump 176 which maintains at least a partial vacuum over the liquid nitrogen contained in second forecooler 134. The three separate and approximately equal flows of hydrogen feed are each cooled to about 90° K. in their respective heat exchanges. The separately cooled hydrogen feed streams are withdrawn from heat exchanger 120, 122, and 124 through branch conduits 114A, 116A, and 118A respectively located at the cold ends of heat exchangers 120, 122, and 124 and passed to conduit 139 for passage to first forecooler 128. The recombined hydrogen feed stream is further cooled to about 80° K. in first forecooler 128 by liquid nitrogen which is evaporated at near atmospheric pressure. Liquid nitrogen at atmospheric pressure is introduced by means of conduit 133 into first forecooler 128 at a rate of about 77,000 c.f.h. measured at NTP. The liquid nitrogen evaporated by cooling the hydrogen feed stream in path 129 of first forecooler 128 exits from the forecooler through conduit 131 and is subsequently passed to conduit 135 for passage to heat exchanger 122 for countercurrent cooling of the separate hydrogen feed stream flowing therethrough as previously described. In addition to the evaporated liquid nitrogen obtained from first forecooler 128, additional nitrogen vapor may be supplied from a nitrogen purification unit (not shown) at a rate of about 30,000 c.f.h. measured at NTP through conduit 133, where it combines with the nitrogen vapor flowing in conduit 131 to form the cooling requirement of heat exchanger 122. The nitrogen refrigerant utilized herein is illustrative of the type of refrigerant which it becomes necessary to employ in a given liquefaction cycle. The utilization of a particular refrigerant will depend in large measure upon the liquefaction temperature of the feed gas. Thus, for example, if methane were to be liquefied, liquid nitrogen would not be a practical refrigerant to use. In this instance, mechanical refrigeration apparatus utilizing ammonia or other suitable refrigerants such as dichlorofluoromethane might be employed to produce economic forecooling of the methane feed stream to about −40° C.

The hydrogen to be liquefied exits from first forecooler 128 through conduit 149 and is passed to an intermediate heat exchanger 130 whereupon the hydrogen is further cooled to about 67° K. in path 151 by countercurrent heat exchange with recycled hydrogen refrigerant. The further cooled hydrogen feed is passed to adsorbent trap 132 containing a suitable adsorbent, for example, activated carbon, wherein remaining impurities are removed. The clean, further cooled hydrogen feed is then passed to second forecooler 134, having heat exchange path 136 and catalyst bed 138 therein, wherein the cleaned, further cooled hydrogen feed is still further cooled to about 65° K. in evaporating liquid nitrogen and conversion to about 58% para-hydrogen is effected. The liquid nitrogen is supplied to second forecooler 134 from branch conduit 153 having control valve 155 therein. The catalyst bed 138, which causes the conversion from the usual 25% ortho-hydrogen concentration to about 58% para-hydrogen, may consist of substantially pure $Fe_2O_3$ pellets, although other catalysts could be used. A portion of the partially converted, still further cooled hydrogen feed exiting from second forecooler 134 is subsequently diverted to branch conduit 140 having work expander 142 therein. The undiverted portion is directed to cold heat exchanger 146, having heat exchange paths 148 and 150 and negative integral Joule-Thomson zone utilizing expansion valve 152 therein, wherein the undiverted portion of the partially converted hydrogen feed stream is further cooled in paths 148 and 150 by countercurrent heat exchange with recirculating hydrogen refrigerant gas. Between cooling paths 148 and 150, the partially converted hydrogen feed stream is expanded at negative integral expansion zone 152. As previously stated, it has been found preferable to locate the negative integral expansion zone 152 at a temperature at least 5° K. warmer than the temperature of the saturation temperature of the product liquid in second condenser converter 170, i.e., the temperature of the feed stream leaving heat exchange path 148 and entering negative integral expansion zone 152 is at least 5° K. warmer than the liquefied portion of the feed stream. Locating the negative integral expansion zone 152 in this region assures that appreciable cooling occurs within the coldest heat exchanger before the final Joule-Thomson expansion occurring at either valve 154 or 156. The critical requirement in selecting the temperature level at which the negative integral expansion is to be utilized for the intermediate pressure reduction step is that the location, and hence temperature, be selected so as to maintain the maximum temperature difference in the cold end of the heat exchanger wherein the negative integral expansion occurs, i.e., the temperature difference experienced by the feed stream as it is expanded across negative integral expansion zone 152 at least be maintained such that $\Delta T = 0$ and preferably such that $\Delta T > 0$. Such operation permits the heat transfer surface to be minimized thereby reducing equipment cost, and what is more important to reduce the external surface area contributing to process heat leakage thereby permitting more efficient use of the refrigeration supplied by the cycle for liquefaction purposes. While more than one negative integral Joule-Thomson expansion step might be employed, for simplicity only one negative integral expansion zone in parallel with a work expansion step is normally used.

Upon exiting from cold heat exchanger 146 through conduit 157, the partially converted undiverted hydrogen feed stream is further divided into a first fraction and a second fraction. The first fraction is directed to branch conduit 159 having product expansion valve 154 therein, whereby the partially converted hydrogen is liquefied and passed to condenser-converter 170 whereupon the resulting partially converted para-hydrogen liquid is converted to above 95% para-hydrogen by contact with catalyst bed 158. The partially converted second fraction, which continues to flow in conduit 157 is isenthalpically expanded at refrigerant expansion valve 156 and passed to the liquid chamber of condenser-converter 170 having heat exchanger 166 therein. Heat exchanger 166 functions to condense the vapor arising from the ortho-para conversion process occurring in catalyst bed 158. The vapors resulting from the condensation of the ortho-para conversion vapors leave condenser-converter 170 through conduit 164 and form at least part of the vapor utilized as process refrigeration. The substantially converted liquid hydrogen product is withdrawn from condenser-converter 170 through conduit 171 having product take-off valve 160 therein and passed to reservoir 162. Any vapor resulting from the evaporation of the converted liquid hydrogen in reservoir 162 leaves through conduit 173 and is combined with the cold vapors flowing in conduit 164. The cold hydrogen vapors from the work expanded, partially converted first portion of the hydrogen feed after having been work expanded at 142 flowing in conduit 140A are also combined with the cold hydrogen vapors flowing in conduits 173 and 164. The cold hydrogen vapors obtained from these three sources flow through conduit 168 to provide the refrigeration requirement for cold heat exchanger 146, intermediate heat exchanger 130 and first heat exchanger 120. The warmed hydrogen refrigerant upon leaving the warm end of heat exchanger 120 through conduit 127 is passed to main compressor 170 for recompression to approximately 880 p.s.i.g.

As previously pointed out, the processes hereinabove presented and described in detail utilizing hydrogen as the feed and refrigerant are exemplary of the feed gases which may be liquefied in accordance with the principles of this invention. The process and apparatus presented herein are admirably suited for the liquefaction of helium and neon as well as other types of low-boiling gases previously mentioned. It is thus obvious that modifications of the concepts presented herein may be made all within the spirit and scope of this invention.

What is claimed is:

1. A process for the liquefaction of a gaseous feed stream having an atmospheric pressure boiling point below about $-150°$ C. comprising the steps of compressing said gaseous feed stream to at least twice its critical pressure; cooling said gaseous feed stream to at least as cold as about $-40°$ C.; dividing said cooled gaseous feed stream into diverted and undiverted portions; further cooling said undiverted feed stream; expanding said undiverted feed stream within a negative integral Joule-Thomson expansion zone; work expanding said diverted portion in parallel flow relation with said negative integral Joule-Thomson expansion zone to produce process refrigeration; still further cooling said undiverted feed stream; isenthalpically expanding said further cooled undiverted feed stream to achieve at least partial liquefaction thereof and passing the exhaust from the work expansion of said diverted portion in countercurrent heat exchange relation with said undiverted portion to recover the refrigeration thereof.

2. A process for the liquefaction of a gaseous feed stream having an atmospheric boiling point below about $-150°$ C. comprising the steps of compressing said gaseous feed stream to at least twice its critical pressure; cooling said gaseous feed stream to at least as cold as about $-40°$ C.; dividing said cooled gaseous feed stream into diverted and undiverted portions; further cooling said undiverted feed stream; expanding said undiverted feed stream within a negative integral Joule-Thomson expansion zone; work expanding said undiverted portion in parallel flow relation with said negative integral Joule-Thomson expansion zone to produce process refrigeration; still further cooling said undiverted feed stream; isenthalpically expanding said further cooled undiverted feed stream to achieve at least partial liquefaction thereof; combining the remaining vaporous feed stream with vaporous exhaust from the work expansion of said diverted portion; and passing the combined vapors in countercurrent heat exchange relation with said undiverted portion to recover the refrigeration thereof.

3. A process for the liquefaction of a gaseous feed stream having an atmospheric boiling point below about $-150°$ C. comprising the steps of compressing said gaseous feed stream to at least twice its critical pressure; cooling said gaseous feed stream to at least as cold as about $-40°$ C.; dividing said cooled gaseous feed stream into diverted and undiverted portions; further cooling said undiverted feed stream to a temperature level greater than about 5° C. above the liquefaction temperature of the process feed stream; expanding said undiverted feed stream within a negative integral Joule-Thomson expansion zone; work expanding said undiverted portion in parallel flow relation with said negative integral Joule-Thomson expansion zone to produce process refrigeration; still further cooling said undiverted feed stream, isenthalpically expanding said further cooled undiverted feed stream to achieve at least partial liquefaction thereof; combining the remaining vaporous feed stream with vaporous exhaust from the work expansion of said diverted portion; and passing the combined vapors in countercurrent heat exchange relation with said undiverted portion to recover the refrigeration thereof.

4. A process for the liquefaction of a gaseous feed stream having an atmospheric boiling point below about −150° C. according to claim 3 wherein said undiverted feed stream is not less than about 40% and not greater than about 60% of the total gaseous feed stream.

5. A process for the liquefaction of a gaseous feed stream having an atmospheric boiling point below about −243° C. comprising the steps of compressing said gaseous feed stream to at least twice its critical pressure; cooling said gaseous feed stream to at least about −198° C.; dividing said cooled gaseous feed stream into diverted and undiverted portions; further cooling said undiverted feed stream to a temperature level greater than about 5° C. above the liquefaction temperature of the feed stream; expanding said undiverted feed stream within a negative integral Joule-Thomson expansion zone; work expanding said undiverted portion in parallel flow relation with said negative integral Joule-Thomson expansion zone to produce process refrigeration; still further cooling said undiverted feed stream; isenthalpically expanding said further cooled undiverted feed stream to achieve at least partial liquefaction thereof; combining the remaining vaporous feed stream with vaporous exhaust from the work expansion of said diverted portion; and passing the combined vapors in countercurrent heat exchange relation with said undiverted portion to recover the refrigeration thereof.

6. A process for the liquefaction of a gaseous feed stream having an atmospheric boiling point below about −243° C. according to claim 5 wherein said undiverted feed stream is not less than about 40% and not greater than about 60% of the total gaseous feed stream.

7. A process for the liquefaction of a gaseous feed stream having an atmospheric boiling point below about −150° C. comprising the steps of compressing said gaseous feed stream; cooling said gaseous feed stream to at least about −40° C.; providing a cooled process refrigerant stream compressed to at least twice its critical pressure flowing in cocurrent heat exchange relation with said gaseous feed stream; dividing said process refrigerant stream into diverted and undiverted portions; further cooling said feed stream and said undiverted refrigerant countercurrently against a recycling refrigerant stream; expanding said undiverted refrigerant stream within a negative integral Joule-Thomson expansion zone; work expanding said diverted portion in parallel flow relation with said negative integral Joule-Thomson expansion zone to produce process refrigeration; still further cooling said feed stream and said undiverted refrigerant stream countercurrently against said recycling refrigerant stream; isenthalpically expanding said still further cooled undiverted refrigerant stream to achieve at least partial liquefaction thereof; passing said undiverted isenthalpically expanded liquid and vapor refrigerant to a condensing zone; passing said further cooled feed stream to said condensing zone for liquefaction thereof; and passing the exhaust from the work expansion of said diverted portion in heat exchange relation with said feed stream and said undiverted refrigerant stream as said recycling refrigerant stream.

8. A process for the liquefaction of a gaseous feed stream having an atmospheric boiling point below about −150° C. comprising the steps of compressing said gaseous feed stream; cooling said gaseous feed stream to at least about −40° C.; providing a cooled process refrigerant stream compressed to at least twice its critical pressure flowing in cocurrent heat exchange relation with said gaseous feed stream; dividing said process refrigerant stream into diverted and undiverted portions; further cooling said feed stream and said undiverted refrigerant countercurrently against a recycling refrigerant stream; expanding said undiverted refrigerant stream within a negative integral Joule-Thomson expansion zone; work expanding said diverted portion in parallel flow relation with said negative integral Joule-Thomson expansion zone to produce process refrigeration; still further cooling said feed stream and said undiverted refrigerant stream countercurrently against said recycling refrigerant stream; isenthalpically expanding said still further cooled undiverted refrigerant stream to achieve at least partial liquefaction thereof; passing said undiverted isenthalpically expanded liquid and vapor refrigerant to a condensing zone; passing said further cooled feed stream to said condensing zone for liquefaction thereof; removing the vaporous refrigerant from said condensing zone; combining the vaporous refrigerant with vaporous exhaust from the work expansion; and passing said combined vapors in countercurrent heat exchange relation with said feed stream and said undiverted refrigerant stream as said recycling refrigerant stream.

9. A process for the liquefaction of a gaseous feed stream having an atmospheric boiling point below about −150° C. comprising the steps of compressing said gaseous feed stream; cooling said gaseous feed stream to at least about −40° C.; providing a cooled process refrigerant stream compressed to at least twice its critical pressure flowing in cocurrent heat exchange relation with said gaseous feed stream; dividing said process refrigerant stream into diverted and undiverted portions; further cooling said feed stream and said undiverted refrigerant countercurrently against a recycling refrigerant stream whereby at least said undiverted refrigerant stream is cooled to a temperature level greater than about 5° C. above its process liquefaction temperature; expanding said undiverted refrigerant stream within a negative integral Joule-Thomson expansion zone; work expanding said diverted portion in parallel flow relation with said negative integral Joule-Thomson expansion zone to produce process refrigeration; still further cooling said feed stream and said undiverted refrigerant stream countercurrently against said recycling refrigerant stream; isenthalpically expanding said still further cooled undiverted refrigerant stream to achieve at least partial liquefaction thereof; passing said undiverted isenthalpically expanded liquid and vapor refrigerant to a condensing zone; passing said further cooled feed stream to said condensing zone for liquefaction thereof; removing the vaporous refrigerant from said condensing zone; combining the vaporous refrigerant with vaporous exhaust from the work expansion; and passing said combined vapors in countercurrent heat exchange relation with said feed stream and said undiverted refrigerant stream as said recycling refrigerant stream.

10. A process for the liquefaction of a gaseous feed stream having an atmospheric boiling point below about −243° C. comprising the steps of compressing said gaseous feed stream; cooling said gaseous feed stream to at least about −198° C.; providing a cooled process refrigerant stream compressed to at least twice its critical pressure flowing in cocurrent heat exchange relation with said gaseous feed stream; dividing said process refrigerant stream into diverted and undiverted portions; further cooling said feed stream and said undiverted refrigerant countercurrently against a recycling refrigerant stream whereby at least said undiverted refrigerant stream is cooled to a temperature level greater than about 5° C. above its process liquefaction temperature; expanding said undiverted refrigerant stream within a negative integral Joule-Thomson expansion zone; work expanding said diverted portion in parallel flow relation with said negative integral Joule-Thomson expansion zone to produce process refrigeration; still further cooling said feed stream and said undiverted refrigerant stream countercurrently against said recycling refrigerant stream; isenthalpically expanding said still further cooled undiverted refrigerant stream to achieve at least partial liquefaction thereof; passing said undiverted isenthalpically expanded liquid and vapor refrigerant to a condensing zone; passing said further cooled feed stream to said condensing zone for liquefaction thereof; removing the vaporous refrigerant from said condensing zone; combining the vaporous refrigerant with vaporous exhaust from the work expansion; and passing said combined vapors in countercurrent heat exchange relation with said feed stream and said undiverted refrigerant stream as said recycling refrigerant stream.

11. A process for the liquefaction of a hydrogen feed stream comprising the steps of compressing said feed stream to at least twice its critical pressure; cooling said hydrogen feed stream against recirculating hydrogen and evaporating liquid nitrogen refrigerants to at least about −198° C.; passing said hydrogen feed stream to a forecooling and first catalytic conversion zone for further cooling against evaporating liquid nitrogen and partial conversion of the ortho-hydrogen content of said feed stream to para-hydrogen; dividing the partially converted hydrogen feed stream from said forecooling and first catalytic conversion zone into diverted and undiverted portions; work expanding said diverted portion to produce process refrigeration; passing said undiverted portion to a cold heat exchange zone for still further cooling therein; expanding said undiverted portion within a negative integral Joule-Thomson expansion zone in parallel flow relation with said work expanding; further dividing said undiverted portion into a product portion and a refrigerant portion; isenthalpically expanding said refrigerant portion of said undiverted feed stream to achieve at least partial liquefaction thereof; passing the liquefied refrigerant portion to a condensing zone; isenthalpically expanding said product portion of said undiverted feed stream to achieve at least partial liquefaction thereof; passing the at least partially liquefied product portion to said condensing and second catalytic conversion zone for further liquefaction thereof against the evaporating refrigerant portion and further conversion of ortho-hydrogen to para-hydrogen and passing the exhaust from the work expansion of said diverted portion in heat exchange relation with said undiverted portion to recover the refrigeration thereof.

12. A process for the liquefaction of a hydrogen feed stream comprising the steps of compressing said feed stream to at least twice its critical pressure; cooling said hydrogen feed stream against recirculating hydrogen and evaporating liquid nitrogen refrigerants to at least about −198° C.; passing said hydrogen feed stream to a forecooling and first catalytic conversion zone for further cooling against evaporating liquid nitrogen and partial conversion of the ortho-hydrogen content of said feed stream to para-hydrogen; dividing the partially converted hydrogen feed stream from said forecooling and first catalytic conversion zone into diverted and undiverted portions; work expanding said diverted portion to produce process refrigeration; passing said undiverted portion to a cold heat exchange zone for still further cooling therein; expanding said undiverted portion within a negative integral Joule-Thomson expansion zone in parallel flow relation with said work expanding; further dividing said undiverted portion into a product portion and a refrigerant portion; isenthalpically expanding said refrigerant portion of said undiverted feed stream to achieve at least partial liquefaction thereof; passing the liquefied refrigerant portion to a condensing zone; isenthalpically expanding said product portion of said undiverted feed stream to achieve at least partial liquefaction thereof; passing the at least partially liquefied product portion to said condensing and second catalytic conversion zone for further liquefaction thereof against the evaporating refrigerant portion and further conversion of ortho-hydrogen to para-hydrogen; removing the converted product portion of said undiverted feed stream from said condensing and second catalytic conversion zone and passing said product portion to a product liquid holding zone; combining the product vapors from said product holding zone, the refrigerant vapors from said condensing zone and the exhaust from the work expanding step to produce said recirculating refrigerant; and rewarming said recirculating refrigerant against at least the undiverted portion of said feed stream.

13. A process for the liquefaction of a hydrogen feed stream comprising the steps of compressing said feed stream to at least twice its critical pressure; cooling said hydrogen feed stream against recirculating hydrogen and evaporating liquid nitrogen refrigerants to at least about −198° C.; passing said hydrogen feed stream to a forecooling and first catalytic conversion zone for further cooling against evaporating liquid nitrogen and partial conversion of the ortho-hydrogen content of said feed stream to para-hydrogen; dividing the partially converted hydrogen feed stream from said forecooling and first catalytic conversion zone into diverted and undiverted portions; work expanding said diverted portion to produce process refrigeration; passing said undiverted portion to a cold heat exchange zone for still further cooling therein to a temperature level at least 5° C. above the liquefaction temperature of the process hydrogen feed stream; expanding said undiverted portion within a negative integral Joule-Thomson expansion zone in parallel flow relation with said work expanding; further dividing said undiverted portion into a product portion and a refrigerant portion; isenthalpically expanding said refrigerant portion of said undiverted feed stream to achieve at least partial liquefaction thereof; passing the liquefied refrigerant portion to a condensing zone; isenthalpically expanding said product portion of said undiverted feed stream to achieve at least partially liquefied product portion to said condensing and second catalytic conversion zone for further liquefaction thereof against the evaporating refrigerant portion and further conversion of ortho-hydrogen to para-hydrogen; removing the converted product portion of said undiverted feed stream from said condensing and second catalytic conversion zone and passing said product portion to a product liquid holding zone; combining the product vapors from said product holding zone, the refrigerant vapors from said condensing and second catalytic conversion zone and the exhaust from the work expanding step to produce said recirculating refrigerant; and rewarming said recirculating refrigerant against at least the undiverted portion of said feed stream.

14. A process for the liquefaction of a hydrogen feed stream according to claim 13 wherein said undiverted feed stream is not less than about 40% and not greater than about 60% of the total hydrogen feed stream.

References Cited by the Examiner
UNITED STATES PATENTS

| | | |
|---|---|---|
| 1,901,389 | 3/33 | Hazard-Flamand. |
| 2,458,894 | 1/49 | Collins. |
| 2,509,034 | 5/50 | Claitor. |
| 2,760,356 | 8/56 | Sixsmith. |
| 2,932,173 | 4/60 | Mordhorst. |
| 2,937,076 | 5/60 | Class _____ 23—210 |
| 2,959,021 | 11/60 | Granier _____ 62—29 |
| 3,095,274 | 6/63 | Crawford _____ 23—210 |

FOREIGN PATENTS

| | | |
|---|---|---|
| 560,692 | 3/58 | Belgium. |
| 831,613 | 3/60 | Great Britain. |

OTHER REFERENCES

"Gas Liquefaction and Rectification," Davis, published by Longmans, Green and Company, 1949, New York, pages 69–71 relied on.

"Cryogenic Engineering," Russell B. Scott, published by D. Van Nostrand Company, Incorporated, 1959, New Jersey, pages 62–64 relied on.

"Advances in Cryogenic Engineering," volume 3, Timmerhaus, published by Plenum Press, Inc., 1960, New York, pages 64–72 relied on.

NORMAN YUDKOFF, *Primary Examiner.*

ROBERT A. O'LEARY, GEORGE D. MITCHELL,
*Examiners.*